United States Patent
Tamura et al.

(10) Patent No.: US 10,491,088 B2
(45) Date of Patent: Nov. 26, 2019

(54) PERMANENT MAGNET MOTOR WITH A ROTOR HAVING PRESS FITTED RIVETS AND PRESS FITTED SHAFT AND PIN HOLES AND A METHOD FOR MANUFACTURING THE ROTOR

(71) Applicant: Mitsubishi Electric Corporation, Tokyo (JP)

(72) Inventors: Yuki Tamura, Tokyo (JP); Koji Masumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 218 days.

(21) Appl. No.: 15/109,914

(22) PCT Filed: Feb. 20, 2014

(86) PCT No.: PCT/JP2014/054033
§ 371 (c)(1),
(2) Date: Jul. 6, 2016

(87) PCT Pub. No.: WO2015/125254
PCT Pub. Date: Aug. 27, 2015

(65) Prior Publication Data
US 2016/0329784 A1    Nov. 10, 2016

(51) Int. Cl.
*H02K 7/00*    (2006.01)
*H02K 15/03*    (2006.01)
(Continued)

(52) U.S. Cl.
CPC ......... *H02K 15/03* (2013.01); *F04C 18/0215* (2013.01); *F25B 31/02* (2013.01);
(Continued)

(58) Field of Classification Search
CPC ...... H02K 15/02; H02K 15/03; H02K 15/165; H02K 2201/09; H02K 7/14; H02K 1/2706; H02K 1/276; H02K 2213/03; F25B 31/02
(Continued)

(56) References Cited

U.S. PATENT DOCUMENTS 4,027,229 A * 5/1977 Frink ................... H02K 21/028
322/50
RE33,655 E * 8/1991 Hershberger ......... D06F 37/304
68/23.7
(Continued)

FOREIGN PATENT DOCUMENTS

JP    05-103449 A    4/1993
JP    06-014505 A    1/1994
(Continued)

OTHER PUBLICATIONS

International Search Report of the International Searching Authority dated May 27, 2014 for the corresponding International application No. PCT/JP2014/054033 (and English translation).
(Continued)

*Primary Examiner* — Mang Tin Bik Lian
*Assistant Examiner* — Maged M Almawri
(74) *Attorney, Agent, or Firm* — Posz Law Group, PLC

(57) ABSTRACT

A rotor includes a rotor core which is formed by stacking steel plates and includes a first through hole in a center part, at least one second through hole in the vicinity of the first through hole and a rivet insertion hole. The rotor also includes permanent magnets which are disposed in a circumferential direction of the rotor core and are embedded in a stacking direction of the steel plates; a main shaft which is shrink-fitted or press-fitted in the first through hole of the rotor core; a pin made of an insulating material and inserted (Continued)

in the second through hole of the rotor core; and an upper end plate and a lower end plate which are disposed on both ends of the rotor core in the stacking direction and are fixed by a rivet inserted in the rivet insertion hole.

9 Claims, 5 Drawing Sheets

(51) Int. Cl.
  *H02K 7/14* (2006.01)
  *F04C 18/02* (2006.01)
  *F25B 31/02* (2006.01)
  *H02K 1/27* (2006.01)
  *F04C 29/02* (2006.01)

(52) U.S. Cl.
  CPC ............ *H02K 1/2706* (2013.01); *H02K 7/14* (2013.01); *F04C 29/025* (2013.01); *F04C 2230/60* (2013.01); *F04C 2240/40* (2013.01)

(58) Field of Classification Search
  USPC .................. 310/156.01, 216.001, 156.1, 310/156.18–156.21, 156.53, 156, 56, 57, 310/156.78, 156.83
  See application file for complete search history.

(56) References Cited

U.S. PATENT DOCUMENTS

| | | | | | |
|---|---|---|---|---|---|
| 5,255,425 | A * | 10/1993 | Kanno | ............... | H02K 15/024 29/596 |
| 5,581,140 | A * | 12/1996 | Futami | ................ | H02K 1/276 310/156.53 |
| 5,666,015 | A * | 9/1997 | Uchibori | ............ | H02K 1/276 310/156.53 |
| 6,034,461 | A * | 3/2000 | Sun | .................... | H02K 1/148 310/179 |
| 6,047,460 | A * | 4/2000 | Nagate | ................ | H02K 1/276 205/137 |
| 6,147,428 | A * | 11/2000 | Takezawa | ............ | H02K 1/2766 310/156.57 |
| 7,103,961 | B2 * | 9/2006 | Fujita | ................. | H02K 1/146 29/521 |
| 7,479,723 | B2 * | 1/2009 | Dawsey | ............... | H02K 1/2766 310/156.57 |
| 7,562,609 | B2 * | 7/2009 | Ueno | .................... | B21D 28/28 72/327 |
| 7,843,101 | B2 * | 11/2010 | Ito | ........................ | H02K 1/2766 310/156.46 |
| 7,851,960 | B2 * | 12/2010 | Lee | ........................ | H02K 1/246 310/156.53 |
| 7,906,882 | B2 * | 3/2011 | Okuma | ................. | H02K 1/276 310/156.53 |
| 8,051,710 | B2 * | 11/2011 | Van Dam | ............... | G01M 1/36 310/262 |
| 8,405,269 | B2 * | 3/2013 | Spaggiari | .............. | H02K 1/276 310/156.45 |
| 8,922,083 | B2 * | 12/2014 | Asahi | ................... | H02K 1/2706 310/156.08 |
| 2003/0020351 | A1 * | 1/2003 | Lee | ........................ | H02K 1/246 310/156.53 |
| 2004/0164837 | A1 * | 8/2004 | Fujita | .................... | H02K 1/146 336/234 |
| 2010/0119390 | A1 * | 5/2010 | Baba | ..................... | H02K 1/276 417/423.7 |
| 2013/0076198 | A1 * | 3/2013 | Asaga | ................... | H02K 1/276 310/216.116 |

FOREIGN PATENT DOCUMENTS

| | | |
|---|---|---|
| JP | 10-309051 A | 11/1998 |
| JP | 11341719 A | 12/1999 |
| JP | 2000-217285 A | 8/2000 |
| JP | 2002-359956 A | 12/2002 |
| JP | 2003-052156 A | 2/2003 |
| JP | 2005-020825 A | 1/2005 |
| JP | 2007-252076 A | 9/2007 |
| JP | 2009-171654 A | 7/2009 |
| JP | 2010-226932 A | 10/2010 |
| JP | 2012-050253 A | 3/2012 |

OTHER PUBLICATIONS

Office Action dated Nov. 28, 2017 issued in corresponding JP application No. 2016-503838 (and English translation).
Office Action dated Apr. 25, 2017 issued in corresponding JP application No. 2016-503838 (and English translation).

* cited by examiner

PERMANENT MAGNET MOTOR WITH A ROTOR HAVING PRESS FITTED RIVETS AND PRESS FITTED SHAFT AND PIN HOLES AND A METHOD FOR MANUFACTURING THE ROTOR

CROSS REFERENCE TO RELATED APPLICATION

This application is a U.S. national stage application of International Application No. PCT/JP2014/054033 filed on Feb. 20, 2014, the disclosure of which is incorporated herein by reference.

TECHNICAL FIELD

The present invention relates to a rotor having a permanent magnet, a permanent magnet electric motor having a rotor, a fluid machine having a permanent magnet electric motor as a drive source for a compressor mechanism, and a method for manufacturing a rotor.

BACKGROUND ART

Conventionally, an electric compressor (hereinafter, simply referred to as a "compressor"), which is an example of a fluid machine, is used as a component for an air-conditioning apparatus, a refrigerating apparatus, a heat pump apparatus for hot water supplier and the like. A typical compressor includes a compressor mechanism and an electric motor. The electric motor is made up of a rotor and a stator, and a main shaft is fixed to the rotor so as to transmit rotation force to the compressor mechanism. The main shaft is fixed to the rotor by shrink-fitting or press-fitting (for example, see Patent Literature 1).

Further, a rotor core, which is a component of the rotor, is made up of a plurality of stacked steel plates. A permanent magnet is embedded in the stacked steel plates, and end plates made of a non-magnetic material are disposed on both ends of the stacked steel plates. The rotor core is often tightened by a rivet that penetrates the end plates and the stacked steel plates. Further, in some cases, a balance weight is disposed on one or both ends of the rotor core, and the end plates, the stacked steel plates, and the balance weight are tightened by the rivet.

In general, a method for improving a machinability of the rotor core is known, in which a plurality of swage sections (close contact portions) are disposed on the steel plate so that the rotor core is made to a unit by press-fitting into the swage sections when the steel plates are stacked.

Further, when the rotor core is tightened by the rivet, in a typically known method, the permanent magnet in each magnetic pole is tightened by one rivet on either of the outer circumferential side in the radial direction or on the inner circumferential side in the radial direction to the permanent magnet (for example, see Patent Literature 2).

Further, a method for improving a machinability in shrink-fitting or press-fitting the main shaft into the rotor core is known, in which the rivets are disposed on each of the outer circumferential side and on the inner circumferential side in the radial direction to the permanent magnet of the rotor core so that the accuracy of the inner diameter cylindricity of the rotor core is improved by adjusting the tightening force (for example, see Patent Literature 3).

Further, as a method for improving a machinability in shrink-fitting or press-fitting the main shaft by improving the accuracy of the inner diameter cylindricity of the rotor core, a configuration in which a metal pipe having a substantially cylindrical shape is inserted into the inner diameter section of the rotor core is known (for example, see Patent Literature 4).

CITATION LIST

Patent Literature

Patent Literature 1: Japanese Unexamined Patent Application Publication No. 2010-226932 (FIG. 2)
Patent Literature 2: Japanese Unexamined Patent Application Publication No. 6-14505 (FIG. 1)
Patent Literature 3: Japanese Unexamined Patent Application Publication No. 2000-217285 (abstract)
Patent Literature 4: Japanese Unexamined Patent Application Publication No. 2005-20825 (abstract)

SUMMARY OF INVENTION

Technical Problem

Conventionally, in a generally known configuration used for improving machinability of the rotor core, a plurality of swage sections are disposed on an individual steel plate, and the swage sections are press-fitted during stacking of the steel plates to unite the steel plates. Further, an insulating coating is applied to the stacked steel plates so that the adjacent upper and lower steel plates are electrically insulated from each other, thereby preventing generation of large eddy current in the axis direction of the rotor core.

However, in the aforementioned configuration having the swage section, the stacked steel plates are electrically conducted in the axis direction via the press-fitted swage section which serves as a contact. Accordingly, there is a problem that the eddy current which occurs inside the rotor core due to an alternating magnetic field of the stator and the rotor during operation is generated not only on the surface of the steel plate, but also in the axis direction of the rotor core via the swage section of the stacked steel plates, which increases heat generation of the rotor.

This problem causes not only demagnetization resistance of the permanent magnet embedded in the rotor core, but also increase in temperature inside the compressor, leading to deterioration of refrigerating machine oil which protects a sliding section of the compressor and deterioration of a resin used as a sealing material and an insulating material for the electric motor. Particularly, from the recent trend of refrigerant, when a mixed refrigerant including R32 (Difluoromethane refrigerant) having properties of higher temperature and pressure during compression than those of the conventional refrigerant such as R410A, R407C and R404A is used, means for suppressing increase in temperature inside the compressor is required.

Further, in order to improve the machinability of the rotor, a plurality of swage sections are disposed in the steel plates that form the rotor core so that the steel plates are united by press-fitting the swage sections after the steel plates are stacked, thereby improving variation in the accuracy of the inner diameter cylindricity of the through hole formed in the center part. However, during tightening of the stacked steel plates by using the rivet, since it is necessary to apply a load in the stacking direction, there must be deterioration in the inner diameter cylindricity due to a clearance between an outer diameter of the rivet and a through hole in which the rivet is inserted. Accordingly, there is also a problem of occurrence of defect in shrink-fitting or press-fitting of the main shaft into the rotor core.

The present invention has been made to overcome the above problems, and has an object to provide a rotor that can perform suppression of heat generation of the rotor and suppression of variation in the accuracy of the inner diameter cylindricity of the rotor, a permanent magnet electric motor having the rotor; a fluid machine having the permanent magnet electric motor, and a method for manufacturing the rotor.

Solution to Problem

According to an aspect of the present invention, a rotor includes: a rotor core which is formed by stacking steel plates and includes a first through hole in a center part, at least one second through hole in the vicinity of the first through hole and a rivet insertion hole; a plurality of permanent magnets which are disposed in a circumferential direction of the rotor core and are embedded in a stacking direction of the steel plates; a main shaft which is shrink-fitted or press-fitted in the first through hole of the rotor core; a pin made of an electrically insulating material and inserted in the second through hole of the rotor core; and an upper end plate and a lower end plate which are disposed on both ends of the rotor core in the stacking direction of the steel plates and are fixed by a rivet inserted in the rivet insertion hole.

Advantageous Effects of Invention

According to the present invention, since the rotor core is united by using the pin made of an insulating material and inserted in the second through hole of the rotor core, a swage section does not need to be provided or the number of swage sections can be decreased. Accordingly, heat generation of the rotor during operation can be reduced. Further; since the rotor core is united by the pin made of an insulating material, variation of the accuracy of the inner diameter cylindricity of the first through hole of the rotor core can be reduced. Accordingly, defect in shrink-fitting or press-fitting of the main shaft into the rotor core is reduced and the machinability of the rotor is improved.

DESCRIPTION OF EMBODIMENTS

With reference to the drawings, embodiments of the present invention will be described.

Embodiment

Figure 1:
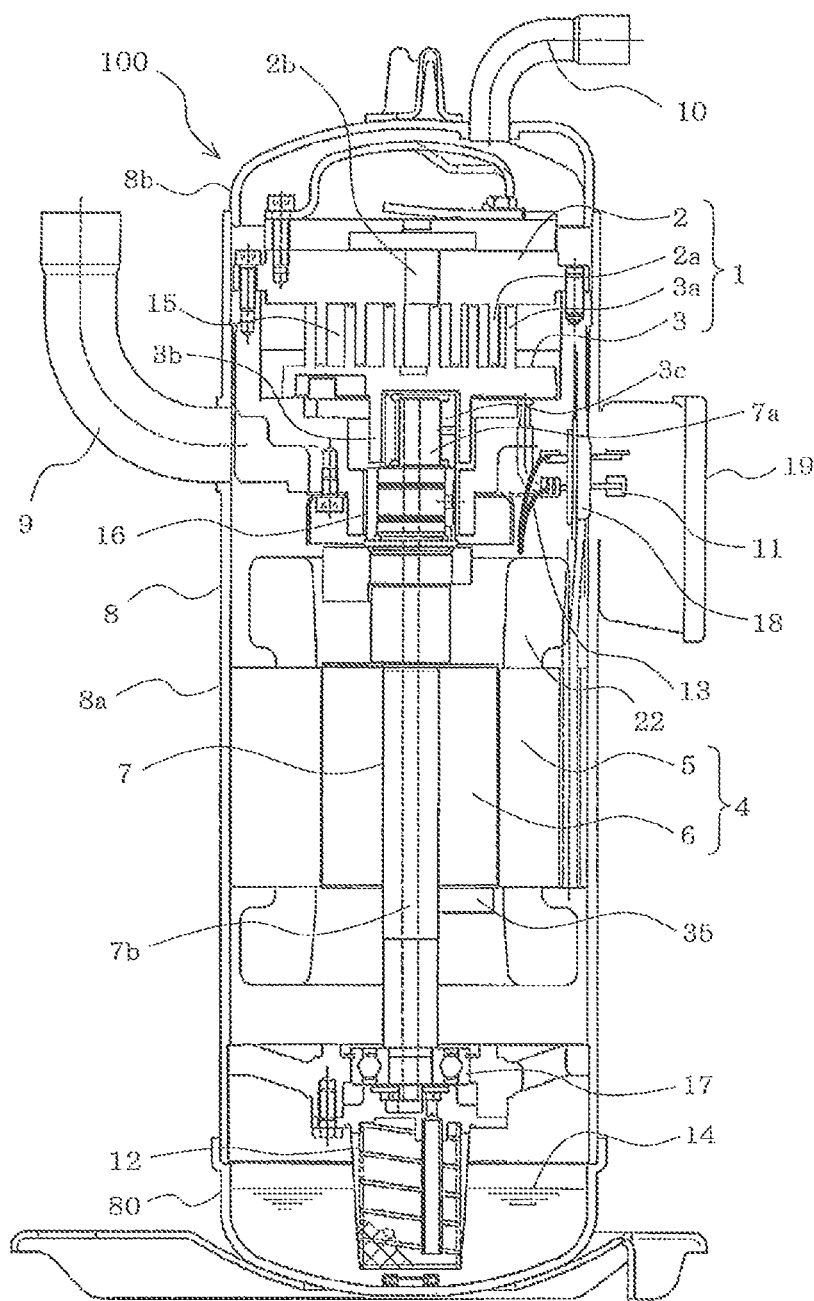
FIG. 1 is a vertical cross sectional view of a hermetic scroll compressor according to Embodiment 1.

FIG. 1 is a vertical cross sectional view of a hermetic scroll compressor according to Embodiment 1.

A hermetic scroll compressor 100, which is an example of a fluid machine, includes a hermetic container 8, and a compressor mechanism 1 and an electric motor 4 housed in the hermetic container 8. The hermetic container 8 is made up of a cylindrical intermediate container 8a, an upper container 8b disposed on the upper side of the intermediate container 8a, and a lower container 8c disposed on the lower side of the intermediate container 8a. The intermediate container 8a is connected to a suction tube 9 for suctioning gas refrigerant. The upper container 8b is connected to a discharge tube 10 that guides the gas refrigerant of high temperature and high pressure which is discharged upward from the compressor mechanism 1 to the outside of the hermetic container 8. The lower container 8c is an oil sump 14 that stores lubricant.

The compressor mechanism 1 is, for example, a scroll type compressor mechanism, and includes a fixed scroll 2 fixed to the intermediate container 8a of the hermetic container 8 and an orbiting scroll 3 that orbits to the fixed scroll 2. The fixed scroll 2 includes a scroll lap 2a provided on a surface that faces the orbiting scroll 3. The orbiting scroll 3 includes a scroll lap 3a having the same shape as that of the scroll lap 2a on a surface that faces the fixed scroll 2. In the state that the fixed scroll 2 and the orbiting scroll 3 are combined, the lap 2a and the lap 3a have opposite winding directions. A compressor chamber 15 is formed between the lap 2a and the lap 3a so as to have a relatively changing volume.

At the center of the fixed scroll 2, a discharge port 2b that discharges the gas refrigerant of high temperature and high pressure is formed. The orbiting scroll 3 performs revolving motion (orbiting motion) to the fixed scroll 2, and an orbiting bearing 3b of a cylindrical shape is disposed at the center on a surface opposite to the lap 3a. A slider 3c is rotatably inserted in the orbiting bearing 3b, and an eccentric shaft 7a disposed on the upper end of a main shaft 7 is inserted in the slider 3c.

The electric motor 4 is, for example, a permanent magnet electric motor having a rotor 6 provided with a permanent magnet, and includes a cylindrical stator 5 and the rotor 6 rotatably disposed in a hollow part of the stator 5. The outer periphery of the stator 5 is fixed to the intermediate container 8a. The stator 5 has a winding 22 that is connected to a terminal 11 via a lead wire 13. The main shaft 7 is shrink-fitted or press-fitted in the center part of the rotor 6, and a balance weight 35 is disposed at the lower end of the rotor 6.

The terminal 11 penetrates through a side wall of the intermediate container 8a. The penetrated position is sealed with a seal member 18. The terminal 11 is housed in a terminal box 19 disposed in the intermediate container 8a so as to be connected to an electric wire from an external power supply.

The main shaft 7 is rotatably supported by an upper bearing member 16 and a lower bearing member 17 disposed at an upper position and a lower position in an axis direction, respectively. The lower end of the main shaft 7 is connected to an oil supply pump 12. When the oil supply pump 12 is actuated in conjunction with rotation of the main shaft 7, the lubricant in the oil sump 14 is suctioned by the oil supply pump 12. The suctioned lubricant is supplied to the lower bearing member 17, the upper bearing member 16 and the like through an oil supply path 7b disposed in the main shaft 7, and is returned to the oil sump 14 in the lower container 8c after it lubricates those components.

Figure 2:
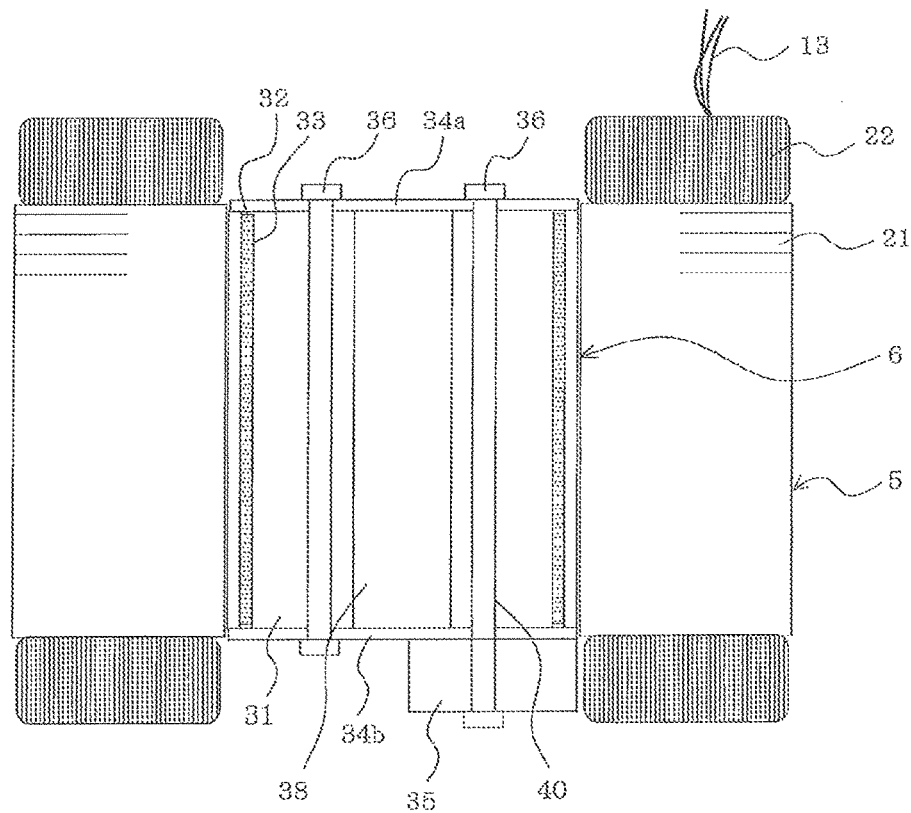
FIG. 2 is an enlarged vertical cross sectional view of the electric motor of FIG. 1.
Figure 3:
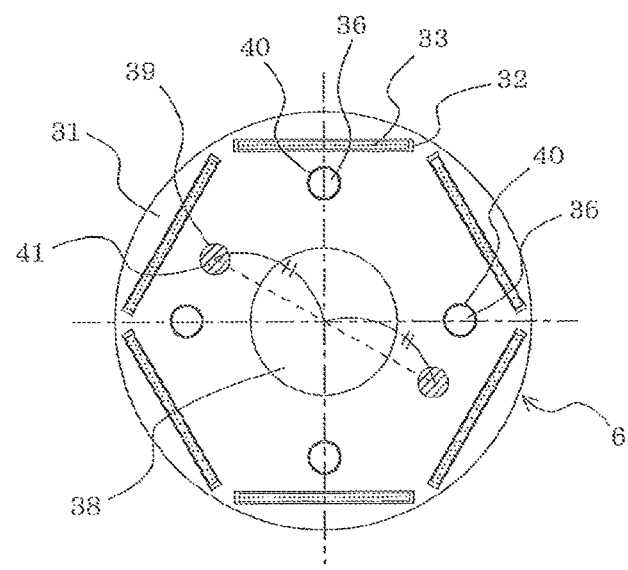
FIG. 3 is a schematic horizontal cross sectional view of the rotor of FIG. 2.
Figure 4:
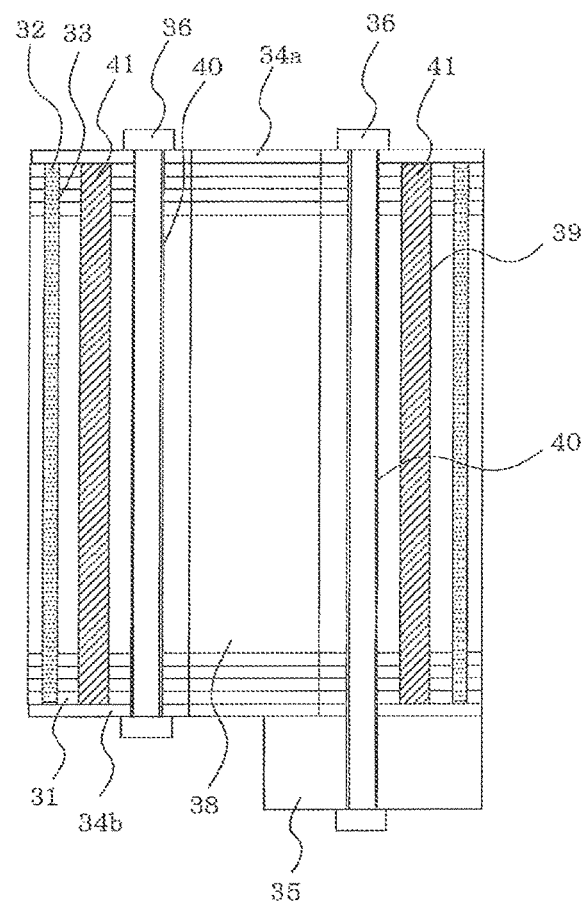
FIG. 4 is a schematic vertical cross sectional view of the rotor of FIG. 3.

With reference to FIGS. 2, 3 and 4, the configuration of the aforementioned stator 5 and rotor 6 of the electric motor 4 will be described in detail.

FIG. 2 is an enlarged vertical cross sectional view of the electric motor of FIG. 1, FIG. 3 is a schematic horizontal cross sectional view of the rotor of FIG. 2, and FIG. 4 is a schematic vertical cross sectional view of the rotor of FIG. 3.

The stator 5 is made up of a stator core 21, and a wiring 22 formed by winding a wire around the stator core 21 for a plurality of times. The stator core 21 is formed by stacking ring-shaped steel plates made of a high magnetic permeability material such as iron. The wiring 22 is connected to the lead wire 13 as described above.

The rotor 6 is made up of a main shaft 7 and a rotor core 31. Similar to the stator 5, the rotor core 31 is formed by stacking ring-shaped steel plates made of a high magnetic permeability material such as iron. A first through hole 38 is formed at the center of the rotor core 31 so that the main shaft 7 is press-fitted in the first through hole 38. The rotor core 31 has a plurality of (the number corresponding to the magnetic poles) magnet insertion holes 32 that are disposed in the circumferential direction, and for example, four rivet insertion holes 40 are disposed in the circumferential direction with an interval of 90 degrees between the magnet insertion holes 32 and the first through hole 38. Permanent magnets 33 are inserted (embedded) in the magnet insertion holes 32, and rivets 36 are inserted in four rivet insertion holes 40.

Further, the rotor core 31 includes an upper end plate 34a and a lower end plate 34b on both ends in the stacking direction each having holes that allow the main shaft 7 and the rivet 36 penetrate therethrough. The upper end plate 34a and the lower end plate 34b tighten the rotor core 31 in the stacking direction from the upper side and the lower side by tightening the rivets 36. One of four rivets 36 tightens the lower end plate 34b while penetrating through the balance weight 35 disposed on the lower end plate 34b of the rotor core 31. In addition to the balance weight 35 disposed on the lower plate 34b of the rotor core 31, the balance weight 35 may also be disposed on the upper end plate 34a of the rotor core 31. In this case, the rivet 36 has a length longer than the rivet 36 by the amount of thickness of the upper end plate 34a and the balance weight 35.

Further, the rotor core 31 has two second through holes 39 at positions symmetrical to the center of the first through hole 38. Two second through holes 39 are disposed at positions of the same distance from the center of the first through hole 38. In two second through holes 39, pins 41 made of an electric insulating material having a diameter which is substantially the same as the second through hole 39 or larger than the inner diameter of the second through hole 39 are press-fitted.

An operation of the hermetic scroll compressor 100 having the above configuration will be described below.

When the winding 22 of the stator 5 is electrically conducted via the terminal 11 and the lead wire 13 of the electric motor 4, electric current is supplied to the winding 22 of the stator 5 to generate a magnetic field, thereby generating a rotation torque to the rotor 6. This rotation torque rotates the rotor 6 and the main shaft 7 of the rotor 6. At this time, the eccentric shaft 7a of the main shaft 7 rotates together, and according to this rotation, the orbiting scroll 3 orbits to the fixed scroll 2. Consequently, gas refrigerant is compressed due to the compression principle of the scroll compressor by cooperation of the orbiting scroll 3 and the fixed scroll 2.

In so doing, gas refrigerant from the suction tube 9 is suctioned into the hermetic container 8, and then suctioned into the compressor mechanism 1 formed by the fixed scroll 2 and the orbiting scroll 3. The gas refrigerant becomes high temperature and high pressure (compressed) due to the above mentioned compression principle, and is discharged from the discharge port 2b of the fixed scroll 2 into the upper container 8b, and is discharged into a refrigerant circuit outside the hermetic container 8 via the discharge tube 10.

Next, the rotor 6 of the electric motor 4 according to Embodiment 1 will be described comparing with the conventional electric motor having a swage section (close contact portion) in the rotor.

Figure 5:
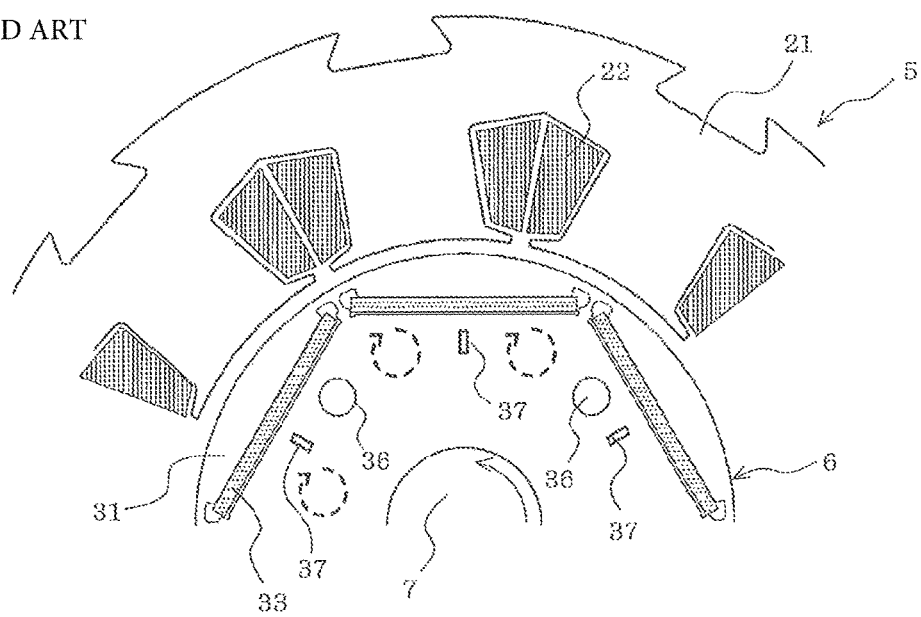
FIG. 5 is a partial horizontal cross sectional view which shows an essential part of the conventional electric motor.
Figure 6:
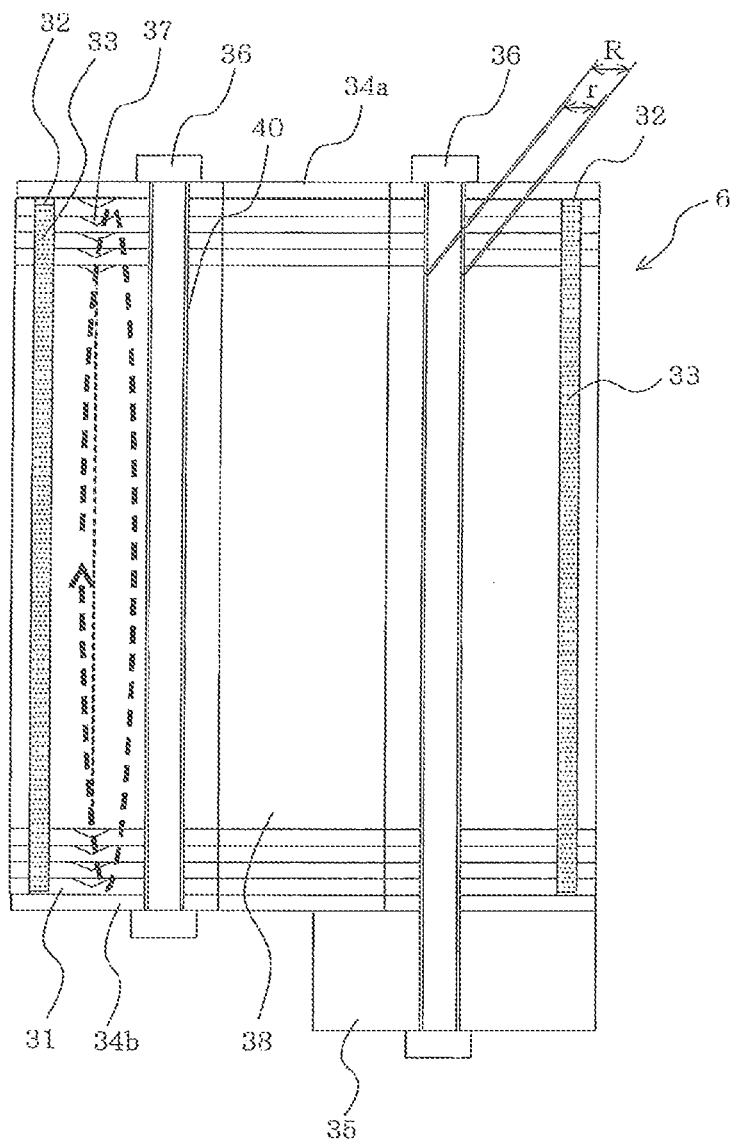
FIG. 6 is a vertical cross sectional view of the rotor shown in FIG. 5.

FIG. 5 is a partial horizontal cross sectional view which shows an essential part of the conventional electric motor, and FIG. 6 is a vertical cross sectional view of the rotor shown in FIG. 5. The same references refer to the elements which are the same as or corresponding to those of Embodiment 1.

As shown in FIG. 5, in the conventional electric motor 4, the swage sections 37 extending in the stacking direction are disposed at a plurality of positions in the circumferential direction of the rotor core 31. Press-fitting into the swage section 37 can fix the steel plates that form the rotor core 31, thereby regulating displacement of the steel plates.

In the electric motor 4 having the rotor core 31, when the winding 22 of the stator 5 is electrically conducted, an alternating magnetic field is generated in the stator 5 and the rotor 6, and small eddy current (indicated by the dotted circle) is generated in each steel plate of the rotor core 31 as shown in FIG. 5. Further, as shown in FIG. 6, the steel plates are electrically conducted through the swage sections 37 of the rotor core 31 which serves as the contact points, and large eddy current (indicated by the dotted ellipse) is generated across the entire rotor core 31 in the stacking direction. This eddy current in the stacking direction causes the rotor core 31 to generate heat. Further, since a load needs to be applied in the stacking direction during tightening of the stacked steel plates by using the rivets 36, there must be deterioration in the inner diameter cylindricity due to a clearance between an outer diameter r of the rivet 36 and a diameter R of the rivet insertion hole 40. Accordingly, a fault in shrink-fitting or press-fitting of the main shaft 7 into the rotor core 31 may occur. That is, a deviation in stacking of the steel plates may occur.

Meanwhile, in Embodiment 1, the steel plates of the rotor core 31 are fixed by the pins 41 made of an insulating material by press-fitting the pins 41 into the second through holes 39 formed in the rotor core 31 unlike the conventional example in which the swage sections 37 are formed on the rotor core 31. In this configuration, generation of eddy current across the rotor core 31 in the stacking direction is reduced although small eddy current (indicated by the dotted circle) is generated in the rotor core 31.

Further, since the pins 41 regulate the deviation of the steel plates of the rotor core 31 in the stacking direction, variation in accuracy of the inner diameter cylindricity of the first through hole 38 of the rotor core 31 can be prevented. Moreover, since the pins 41 are disposed at positions symmetrical to the center of the first through hole 38, the balance of the rotor 6 during rotation is not affected.

As described above, in Embodiment 1, since the rotor core 31 into which two pins 41 are inserted is used for the rotor 6 of the electric motor 4 of the hermetic scroll compressor 100, variation in accuracy of the inner diameter cylindricity of the first through hole 38 of the rotor core 31 can be prevented. Accordingly, the main shaft 7 can be easily shrink-fitted or press-fitted into the rotor core 31, thereby improving machinability of the rotor 6.

Further, since the rotor core 1 is fitted by two pins 41, eddy current generated in the rotor core 31 can be reduced compared with the conventional example in which the steel plates are fitted by press-fitting into the swage sections 37 formed in the steel plates. Accordingly, heat generation of the rotor core 31 can be suppressed, thereby preventing eddy current loss or reduction in the amount of magnetic flux, and increase in temperature inside the electric motor 4. Accordingly, the performance and reliability of the hermetic scroll compressor 100 can be improved.

Further, since the internal temperature of the hermetic scroll compressor 100 can be prevented from increasing by using the electric motor 4 for the hermetic scroll compressor 100, mixed refrigerant including R32 having properties of higher temperature and pressure during compression than those of the refrigerant such as R410A, R407C and R404A can be used.

Further, although Embodiment 1 has a configuration that completely eliminates the swage sections 37, the swage sections 37 are not necessarily completely eliminated in the hermetic scroll compressor 100 that is assumed to use the conventional refrigerant. That is, in the case where reducing effects of eddy current generated in the rotor core 31 and the heat generation of the rotor 6 by the eddy current are not significantly required, a configuration is possible in which the pins 41 are press-fitted in the rotor core 31 while at least one of the swage sections 37 disposed in the circumferential direction of the rotor core 31 is left. In this case, variation in accuracy of the inner diameter cylindricity of the first through hole 38 of the rotor core 31 can also be prevented.

Further, although the pins 41 are made of an insulating material in Embodiment 1, the invention is not limited thereto. For example, as described above, a configuration is possible in which the pins 41 made of a non-insulating material are press-fitted in the rotor core 31 in the hermetic scroll compressor 100 that is assumed to use the conventional refrigerant. However, in this case; although the effect of reducing variation in accuracy of the inner diameter cylindricity of the first through hole 38 of the rotor core 31 can be obtained, it is necessary to consider the risk of generation of eddy current and the amount of heat not less than those in the case of providing the swage sections 37.

Although two pins 41 are used in Embodiment 1, the invention is not limited thereto. For example, one pin 41 may be used. A single pin 41 can sufficiently prevent variation in accuracy of the inner diameter cylindricity of the first through hole 38 of the rotor core 31. Further, eddy current (see FIG. 6) in the stacking direction of the steel plates generated due to conduction of the swage sections 37 can also be prevented.

However, it cannot be avoided that the balance of the rotor 6 during rotation is affected by difference in specific gravity between the pin 41 and the rotor core 31. This can be sufficiently adjusted by the balance weight 35 that is provided on both or one end of the rotor core 31 in the stacking direction. Alternatively, it is also possible to reduce the weight of the balance weight 35 by deciding a position of the second through hole 39 considering the difference in specific gravity between the pin 41 and the rotor core 31 and the balance during rotation of the rotor 6.

Further, there are two methods for manufacturing the rotor 6 in Embodiment 1.

In the first method, the pin 41 is press-fitted into the second through hole 39 of the rotor core 31 and the rotor core 31 is fixed, and then, the main shaft 7 is press-fitted into the first through hole 38. Then, the upper end plate 34a and the lower end plate 4b are disposed on both ends of the rotor core 31 in the stacking direction, and the rivet 36 is inserted into the rivet insertion hole 40 so as to tighten the rotor core 31 in the stacking direction from both sides of the upper end plate 34a and the lower end plate 34b.

In the second method, the pin 41 is fixed at a position that corresponds to the second through hole 39 which is formed when the steel plate is punched out in advance by press machining, and the pin 41 is press-fitted into the second through hole 39 simultaneously with the punching of the steel plate. Then, as described above, the upper end plate 34a and the lower end plate 34b are disposed on both ends of the rotor core 31 in the stacking direction, and the rivet 36 is inserted into the rivet insertion hole 40 so as to tighten the rotor core 31 in the stacking direction from both sides of the upper end plate 34a and the lower end plate 34b.

Embodiment 2

In Embodiment 1, the pin 41 press-fitted in the second through hole 39 of the rotor core 31 is left as it is. However, in Embodiment 2, the pin 41 can be withdrawn after the main shaft 7 is shrink-fitted or press-fitted into the rotor core 31.

Figure 7:
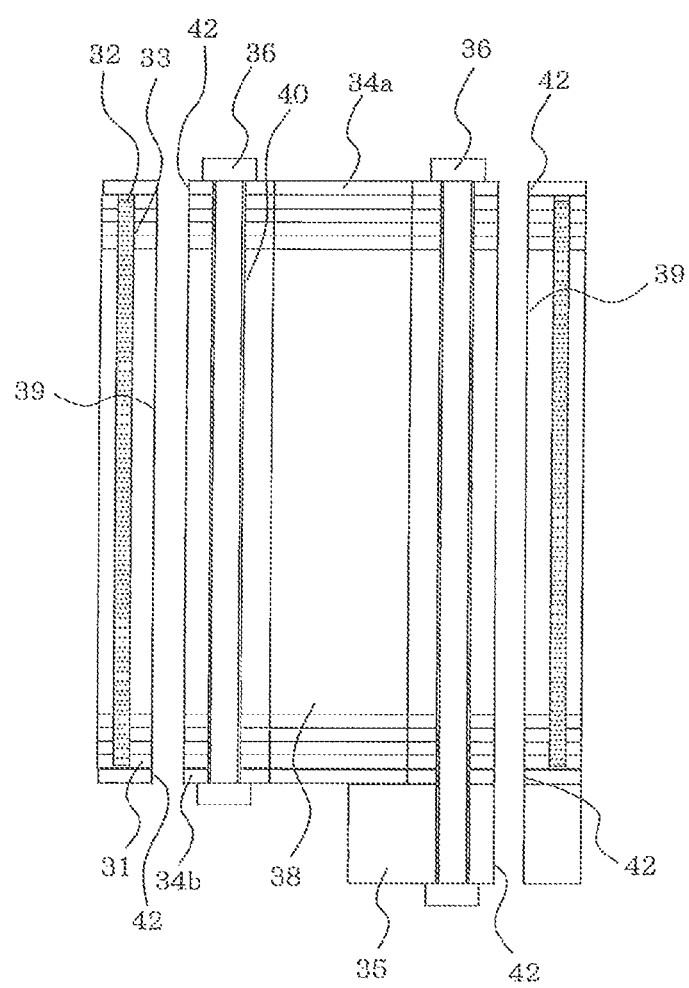
FIG. 7 is a vertical cross sectional view of the rotor of the hermetic scroll compressor according to Embodiment 2.

FIG. 7 is a vertical cross sectional view of the rotor of the hermetic scroll compressor according to Embodiment 2. In Embodiment 2, the same references refer to the same elements as those of Embodiment 1.

In Embodiment 2, the electric motor 4 incorporated in the hermetic scroll compressor is a permanent magnet electric motor as similar to Embodiment 1, and includes the rotor 6 made of the main shaft 7 and the rotor core 31.

As shown in FIG. 7, the first through hole 38 is formed at the center of the rotor core 31 so that the main shaft 7 is shrink-fitted or press-fitted in the first through hole 38. The rotor core 31 has a plurality of (the number corresponding to the magnetic poles) magnet insertion holes 32 that are disposed in the circumferential direction, and for example, four rivet insertion holes 40 are disposed in the circumferential direction with an interval of 90 degrees between the magnet insertion holes 32 and the first through hole 38. The permanent magnets 33 are inserted (embedded) in the magnet insertion holes 32, and the rivets 36 are inserted in four rivet insertion holes 40.

Further, the rotor core 31 has two second through holes 39 at positions symmetrical to the center of the first through hole 38. Two second through holes 39 are disposed at positions of the same distance from the center of the first through hole 38.

Further, the upper end plate 34a and the lower end plate 34b disposed on both ends in the stacking direction of the rotor core 31 have the first through hole 38 into which the main shaft 7 is inserted and the rivet insertion hole 40 into which the rivet 36 is inserted, and a third through hole 42 having the center corresponding to the axis of the second through hole 39. That is, the upper end plate 34a and the lower end plate 34b have two third through holes 42 at positions symmetrical to the center of the first through hole 38 as similar to the second through hole 39. The balance weight 35 is provided with the rivet insertion hole 40 into which the rivet 36 is inserted as similar to Embodiment 1, and one third through hole 42 as similar to the above described third through hole 42. The third through hole 42 has the outer diameter not smaller than that of the pin 41.

One of two pins 41 is formed to have the length larger than the thickness of the upper end plate 34a and the lower end plate 34b and the thickness of the rotor core 31 in the stacking direction, while the other of two pins 41 is formed to have the length larger than the one of two pins 41 by the thickness of the balance weight 35. Those two pins 41 have the strength that can bear the shrink-fitting or press-fitting into the second through hole 39 or withdrawing from the second through hole 39.

That is, in Embodiment 2, the rotor core 31 having two pins 41 withdrawn therefrom after the main shaft 7 is shrink-fitted or press-fitted in the rotor core 31 is used in the rotor 6 of the electric motor 4. Two pins 41 mainly have a function of integrating the stacked steel plates to improve the assembly ability of the rotor core 31 and a function of reducing variation in accuracy of the inner diameter cylindricity of the first through hole 38.

In Embodiment 2, the second through hole 39 of the rotor core 31 is hollow. However, unlike Embodiment 1, there is no need to concern the generation of eddy current due to electric conduction in the stacking direction of the rotor core 31 via the pin 41 in the second through hole 39.

Further, in Embodiment 2, since the pin 41 has the strength that can bear the press-fitting into the second through hole 39 and withdrawing from the second through hole 39, the pin 41 can be used as a reusable assembly jig and also as a phase determination pin 41 during mounting in the main shaft 7.

Although the present invention has been described in connection with Embodiments 1 and 2, the specific configuration is not limited to those Embodiments 1 and 2, and modifications can be made without departing from the principle of the invention. Further, in Embodiments 1 and 2, the hermetic scroll compressor is described as an example of a fluid machine. However, the invention can also be applied to a fluid machine having the rotor 6 according to Embodiments 1 and 2, for example, a pump that feeds liquid such as water and oil.

REFERENCE SIGNS LIST 1 compressor mechanism 2 fixed scroll 2a lap 2b discharge port 3 orbiting scroll 3a lap 3b orbiting bearing 3c slider 4 electric motor 5 stator 6 rotor 7 main shaft 7a eccentric shaft 7b oil supply path 8 hermetic container 8a intermediate container 8b upper container 8c lower container 9 suction tube 10 discharge tube 11 terminal 12 oil supply pump 13 lead wire 14 oil sump 15 compression chamber 16 upper bearing member 17 lower bearing member 18 seal member 19 terminal box 21 stator core 22 winding 31 rotor core 32 magnet insertion hole 33 permanent magnet 34a upper end plate 34b lower end plate 35 balance weight 36 rivet 37 swage section 38 first through hole 39 second through hole 40 rivet insertion hole 41 pin 42 third through hole 100 hermetic scroll compressor

The invention claimed is:

1. A rotor comprising:
a rotor core including at least three stacked steel plates and including a first through hole provided in a center part thereof, the stacked steel plates include an upper end plate and a lower end plate each disposed on corresponding ends of the rotor core in a stacking direction, the rotor core having at least one second through hole provided in the vicinity of the first through hole and at least one rivet insertion hole,
the at least one rivet insertion hole penetrates, in the stacking direction, through all of the stacked steel plates including the upper end plate and the lower end plate, the at least one second through hole penetrates through all of the stacked steel plates except for the upper end plate and the lower end plate, the at least one second through hole is positioned in an eddy current area in the stacking direction;
a plurality of permanent magnets disposed in a circumferential direction of the rotor core and embedded between the upper end plate and the lower end plate in the stacking direction of the steel plates;
a main shaft, the main shaft being shrink-fitted or press-fitted in the first through hole of the rotor core;
at least one pin, the at least one pin being press-fitted in the at least one second through hole of the rotor core and made of an insulating material, each of the at least one pin penetrates through the stacked steel plates except for the upper end plate and the lower end plate, the at least one pin reduces the eddy current which is generated across the rotor core in the stacking direction; and
at least one rivet,
wherein the upper end plate and the lower end plate are penetrated by and fixed by the rivet inserted in the rivet insertion hole,
wherein second through holes including the at least one second through hole and respective pins therein including the at least one pin are disposed at positions symmetrical to a center of the first through hole and each of the second through holes are identically distanced from the center, wherein each of the second through holes with respective pin therein is disposed radially away from the first through hole, wherein each of the second through holes with respective pin therein is disposed radially adjacent to a center of a respective one of the plurality of permanent magnets.

2. The rotor of claim 1, wherein second through holes including the at least one second through hole are disposed at positions symmetrical to a center of the first through hole and each of the second through holes are identically distanced from the center.

3. A method for manufacturing the rotor of claim 1, the method comprising:
press-fitting the pin into the at least one second through hole of the rotor core; and
press-fitting the main shaft into the first through hole of the rotor core.

4. A method for manufacturing the rotor of claim 1, the method comprising:
fixing the pin at a position corresponding to the at least one second through hole formed by punching out the steel plate by press machining in advance; and
press-fitting the pin into the at least one second through hole simultaneously with the punching of the steel plate.

5. The rotor of claim 1, wherein the at least one second through hole is disposed radially away from the first through hole.

6. The rotor of claim 1, wherein at least one second through hole and the at least one pin therein are disposed between two adjacent rivet insertion holes including the at least one rivet insertion hole, and the at least one second through hole is closer to one of the two adjacent rivet insertion holes than an other of the two adjacent rivet insertion holes.

7. A permanent magnet electric motor comprising:
a stator including a stator core formed in a cylindrical shape by stacking steel plates and a wiring mounted on the stator core in accordance with a plurality of phases; and
the rotor of claim 1 rotatably provided in a hollow part of the stator.

8. A fluid machine comprising:
a hermetic container;
a compressor mechanism disposed in the hermetic container and compresses a fluid; and
the permanent magnet electric motor of claim 7 disposed in the hermetic container and connected to the compressor mechanism via the main shaft.

9. The fluid machine of claim 8 wherein mixed refrigerant including R32 Difluoromethane refrigerant is used as the fluid.

* * * * *